United States Patent [19]

Skukowski

[11] Patent Number: 4,513,027

[45] Date of Patent: Apr. 23, 1985

[54] UPC SCANNABLE MARKING COMPOSITION AND APPLICATIONS THEREOF

[75] Inventor: William T. Skukowski, Palmetto, Fla.

[73] Assignee: Tropicana Products, Inc., Bradenton, Fla.

[21] Appl. No.: 578,505

[22] Filed: Feb. 9, 1984

Related U.S. Application Data

[62] Division of Ser. No. 335,400, Dec. 29, 1981, Pat. No. 4,431,693.

[51] Int. Cl.$^3$ .................... B05D 5/06; B41M 1/26; B41M 1/34; B41M 1/40
[52] U.S. Cl. ................. 427/162; 101/426; 427/10; 427/164; 427/165; 427/256; 427/287
[58] Field of Search ............ 101/426; 106/20, 23; 206/45.33, 459; 428/35, 195, 207, 210, 323, 409, 410, 913, 916; 427/10, 162, 164, 165, 256, 287

[56] References Cited

U.S. PATENT DOCUMENTS 3,933,094   1/1976   Murphy et al. .................. 106/23 X

*Primary Examiner*—Bruce H. Hess
*Attorney, Agent, or Firm*—Burns, Doane, Swecker & Mathis

[57] ABSTRACT

A marking composition is provided which comprises a mixture of colored pigment, preferably red, and white pigment in amounts sufficient to provide an effective reflectance in the visible and infrared regions of from about 600 to about 1000 nm, e.g., a reflectance of at least 31.6 percent. The composition can therefore be suitable for the imprinting of indicia in a negative mode for reading by a code indicia scanning apparatus, e.g., such as those used in processing a Universal Product Code symbol. The present invention is particularly applicable to the marking of red product code symbols on a substrate which provides a background of low reflectance.

12 Claims, No Drawings

UPC SCANNABLE MARKING COMPOSITION AND APPLICATIONS THEREOF

This application is a division of application Ser. No. 335,400, filed Dec. 29, 1981, now U.S. Pat. No. 4,431,693.

BACKGROUND OF THE INVENTION

1. Field of the Invention

The present invention relates to a marking composition for use in conjunction with code indicia scanning apparatus, as well as the methods of implementing same and the substrates and products obtained thereby. More particularly, the present invention relates to a red marking composition comprising a mixture of white and red pigments and its use in marking substrates with processable Universal Product Code indicia.

2. Background of the Invention

Optical reader-scanner systems are achieving widespread applications. The systems operate as data input systems by reading codes imprinted on items. Such systems are, for example, being used in businesses for inventory control. One well-known major application is in the use of the UPC (Universal Product Code) system in the grocery supermarket business in conjunction with electronic cash register systems.

The UPC symbol system was developed by the Universal Grocery Product Code Council, Inc., and is a bar code system which provides for binary coding of ten product identification decimal digits. The first five of these digits generally identify the product of the item, and the last five identify the particular item of the product line. The actual symbol is comprised of about sixty parallel light and dark, i.e., relative high light reflective and relative low light reflective (or light absorptive) bars, with the contrast in reflectance between the highly reflective and low reflective and/or absorptive bars necessarily being sufficient to allow an accurate reading of the symbol. Each of the ten digits used to identify the item is represented by a specific group of these bars and the actual encoding of the digit is obtained by a variation in the widths of the bars making up this group.

In some cases, lesser numbers of digits are used and provisions have been made for utilizing greater numbers of digits for future codification. A complete description of the UPC symbol system may be found in a publication entitled "UPC Symbol Specification" dated May 1973 and having been published by Distribution Number Bank, 1725 K Street, N.W. Washington, D.C.

A reader-scanner system contributes to the efficiency and convenience of the operation of automated check-out counters by allowing the UPC symbols to be read automatically as a package is manually transferred from the counter across a scan pattern area or window.

In automatic electronic cash register systems, the data covering such things as pricing, quantity or coupon discounting and the taxable or non-taxable nature of the item are stored in a memory bank of a controller console. The controller is programmed so that the address of this memory bank location corresponds to digital information encoded in the UPC symbol printed on the package of the item.

Typically, the scan pattern system uses a very low-powered scanning laser to provide a coherent beam of monochromatic light. The use of this type of light source provides the high level signal-to-noise ratio necessary for processing that is unavailable from other sources. The laser beam is directed to a scanner mechanism which generates an optical scan pattern at a window in the check-out counter. One example of such an optical reader-scanner system is disclosed in U.S. Pat. No. 4,056,710.

The actual identification of the symbol is made by electronically analyzing the signals generated by the laser light beam that is reflected back from the package surface to an optical detector. The output of the detector then goes to electronic circuitry and is continuously analyzed for the UPC symbol coded content.

When the high speed movement of the light beam crosses the light and dark bars of a UPC symbol, a specific pulse train waveform is generated. The characteristics of this waveform are established by the width of the individual light and dark bars and by the speed of the sweep. If the electronic circuitry determines that the symbol is valid and positive identification of the symbol is made, the signal is passed onto the controller of the cash register system. This output signal provides the address for the memory bank location where the instructions for billing and cash register-receipt recording of that symbol are stored.

If the symbol is not valid, i.e., has been tampered with, altered, damaged, or is simply not readable, the positive identification cannot be made and a no-reading visual or audio alarm is sounded. This notifies the clerk that a visual identification and a manual cash register entry must be made.

Generally, the UPC symbol is made by printing dark bars on a white, reflective background with marking means such as inks of a black color or some other dull color. Initially, this necessitated the use of white labels having black indicia printed thereon, with said labels being attached to the wrapping or container of the commercial product. Of course, the use of such a label can be unsightly and detract from the overall appeal of a packaged product.

If the wrapping or container provided a suitable reflective background, however, the black code indicia could be printed directly on the wrapping or container. But this requires multiple printing stations if the trade dress and/or printed designs were not in black. More specifically, a printing system is required which includes one or more stations for imprinting the colored trade dress designs and at least one additional station for imprinting the coded material in black. Moreover, the black code still detracts from the overall aesthetic quality of the finished product.

Accordingly, the industry has strived to blend code indicia such as UPC indicia into the trade dress and/or packaging of an item to thereby enhance the aesthetic quality of the packaged product or item, but to as well avoid the need for additional printing stations. For example, one method is discussed in U.S. Pat. No. 3,933,094, which discloses the addition of certain metallic compounds to colored inks in order to effect the desired improvements in the infrared absorption characteristics of the ink. Thus, when code indicia are printed with colored inks on a reflective background, a sufficient contrast in reflectance is obtained so that the code can be successfully read.

An additional problem arises, however, when the package does not provide a suitable reflective background of sufficient size on which to print the symbol. In such instances, the return to using labels imprinted with the symbol has been necessary, with its aesthetic disadvantages. A printing of the code in a negative mode has at times been attempted where the trade dress is of a white reflective color and the background provided by the item offers little reflectance. By "negative mode" is meant that the actual printed indicia act as the reflective background of the UPC code symbol and the spaces or voids between the printed indicia, which show the absorptive background, are the non-reflective or absorptive portion of the UPC symbol. Unfortunately, ones trade dress color is not always reflective in the appropriate wavelength region. In particular, the aforediscussed technique cannot be used when the trade dress color is red, a color which is not even read by conventional scanning systems as the scanning laser, e.g., as used in UPC processing systems, are blind to the color red.

Thus, whenever red is the trade dress color, a label has generally had to be used with the trade dress being one color and the indicia of the symbol imprinted in another color. Or, it has been attempted to use a double printing system where the red color is printed or imposed on top of white so that suitable background reflectance can be achieved, with black code indicia then being imprinted thereon. All of these methods, however, suffer from the expense of having to use multiple printing stations and steps amd/or the loss of aesthetic quality by employing a different color. To overcome these problems and disadvantages is a desideratum of the code symbol art. However, no truly practical solution to using red in a symbol to be processed by code indicia scanning apparatus, despite the constant search therefor, has yet been found.

Accordingly, it is an object of the present invention to provide a marking composition which is of a reddish color and which can be used in a code symbol to be processed by a visible or infrared code indicia scanning system.

It is another object of the present invention to provide a method in which a UPC symbol having reddish indicia can be successfully employed on a non-reflective substrate. The provision of a substrate having the said UPC code symbol imprinted thereon is also an object of the present invention.

It is still another object of the present invention to provide a method in which a UPC symbol having reddish indicia can be successfully employed on a transparent container, especially when the container is filled with a fruit juice such as orange juice or grapefruit juice. The provision of such a container having said UPC symbol imprinted thereon is also an object of the present invention.

Still another object of the present invention is to provide a method for the successful employment of code symbols comprising red printed indicia without the need for multiple printing steps.

In general, it is an object of the present invention to provide a marking composition having suitable reflectance in the visible and infrared region of from 600 to about 1000 nm to be appropriate for use as the reflective portion of a code symbol, and to thereby be processable by a code indicia scanning system, wherein the colored pigment of the composition is generally unsuitable for such a purpose alone due to its "insufficient reflectance", i.e., its inability to reflect in the range of from about 600 to about 1000 nm and/or be processed by the code indicia scanning system. The provision of methods for using said composition successfully in imprinting code indicia, without multiple printing steps, and the provision of a substrate imprinted with said code indicia are also objects of the present invention.

These and other objects, as well as the scope, nature and utilization of the invention, will be apparent to those skilled in the art from the following description and the appended claims.

SUMMARY OF THE INVENTION

Provided in one embodiment of the present invention is a colored marking composition containing a colored pigment which by itself exhibits insufficient reflectance in the visible and infrared region of from about 600 to about 1000 nm to make the composition suitable for use as the reflective portion of a code symbol to be processed by a code indicia scanning system, said composition comprising said colored pigment, which exhibits insufficient reflectance in the visible and infrared region of from about 600 to about 1000 nm, and a white pigment which reflects in said visible and infrared region, with said pigments being present in amounts sufficient to provide said composition with a reflectance in said visible and infrared regions suitable for processing by code indicia scanning apparatus when the composition is used to imprint indicia on a relatively low reflective substrate in a negative mode, the voids between the indicia comprising the low reflective portion of the symbol, to thereby provide a code symbol processable by code indicia scanning apparatus. The invention finds particular applicability when the colored pigment is a red pigment and the marking composition is of a red color and is to be used for a UPC symbol.

The present invention also relates to a substrate having a symbol thereon which is processable by code indicia scanning means wherein (i) the substrate exhibits a relatively low reflectance in the range of from about 600 to about 1000 nm, (ii) the indicia imprinted on the substrate are in a negative mode so that the imprinted indicia comprise the reflective background of the symbol and the voids between the printed indicia comprise the low reflective portion of the symbol, and wherein the indicia are printed with a marking composition comprising a colored pigment, preferably a red pigment which substantially does not reflect in the range of from about 600 to about 1000 nm, and a white pigment which reflects in said range of from 600 to 1000 nm, with said pigments being present in amounts sufficient to provide a reflectance relative to the low reflectance substrate suitable for processing by a code indicia scanning system, preferably a scanning system used in conjunction with UPC symbols.

The present invention in a preferred embodiment relates to a transparent container having a Universal Product Code symbol thereon wherein the container is filled with a commodity of relatively low reflectance in the visible region, i.e., around 620 to about 650 nm, where the printed indicia of the symbol comprise the reflective portion of the symbol and the voids between the printed indicia comprise the low reflective portion of the symbol, and where the indicia are printed with a marking composition comprising a white pigment which reflects in the visible region from about 620 to about 650 nm and a red pigment, wherein said pigments are present in amounts sufficient to provide a reflectance relative to the low reflective portion of the symbol suitable for processing by a Universal Product Code scanning apparatus.

In another embodiment, the present invention relates to a process for marking a substrate exhibiting low reflectance with a symbol suitable for use with code indicia scanning apparatus, i.e., such as that employed in the processing of UPC symbols, comprising imprinting indicia on said substrate in the negative mode with a marking composition comprising a colored pigment, preferably red, and a white pigment which reflects in the range of from about 600 to 1000 nm, with said pigments being present in amounts sufficient to provide a contrast in reflectance in said range with regard to the substrate suitable for processing by a code indicia scanning apparatus.

DETAILED DESCRIPTION OF THE INVENTION

The marking composition of the present invention comprises a colored pigment which generally exhibits low reflectance, if any, or non-processable reflectance in the operative wavelength range of a code indicia scanning system. The code indicia scanning systems presently employed generally operate in the visible and infrared regions of from about 600 to about 1000 nm. Universal Product Code systems generally operate in the range of from about 620 to 650 nm, with the majority of systems operating in the range of from about 630 to 640 nm, e.g., about 633 nm. Accordingly, the present invention pertains preferably to colored pigments which exhibit insufficient reflectance in the visible and infrared region of from about 600 to about 1000 nm, i.e., colored pigments which fail to reflect substantially in the range of from about 600 to about 1000, nm and most preferably in the range of from about 620 to 650 nm, or pigments whose reflectance is unable to be read by the code indicia scanning system, e.g., a red pigment, to which the systems are blind.

The composition further comprises a white pigment which reflects in the visible and infrared regions of from about 600 to about 1000 nm, with the colored and white pigments being present in amounts sufficient to provide a suitable reflectance in the range of from 600 to 1000 nm, relative to a substrate which exhibits little if any reflectance in said range, for processing by code indicia scanning apparatus.

In all code indicia scanning or sensing systems, such as those employed to process UPC bar symbols, a fundamental requirement is that there be adequate contrast between the relatively high reflective portion of the symbol and the relatively low reflective portion of the symbol or code. The optimum condition exists, of course, when there is maximum processable reflectance from the high reflective portion of the code symbol and minimum reflectance from the low reflective portion of the code symbol. This contrast between the relative high and low reflective bars of the code symbol is expressed as the Print Contrast Signal (PCS), which is defined by the relationship:

$$PCS = (R_L - R_D)/R_L$$

where $R_L$ is the reflectance factor or percentage of light reflected by the highly reflective portion of the code symbol and $R_D$ is the reflectance factor or percentage of light reflected by the relatively low reflective portion of the code symbol. In a UPC system, depending upon the percent light reflectance of the "dark" bars or low reflectance portion of the code symbol, the "light" background or reflective portion of the code symbol must generally meet, or at least approach, an established specification of light reflectance, and thereby a minimum PCS value, to insure adequate code readability. These guidelines have been established by and are available from Distribution Codes, Inc., the administrator of the Universal Product Code and UPC Symbol. For example, even if the low reflective portion of the code symbol exhibited a percent reflectance ($R_D$) of no more than 2.5, the UPC guidelines set by Distribution Codes, Inc. requires a minimum PCS of 0.921, i.e., a minimum percent light reflectance by the reflective portions of the code symbol ($R_L$) of 31.6 percent, in order to assure that suitable processing by the code indicia scanning apparatus is to occur. Thus, every code indicia scanning system requires at least some minimum reflectance from the reflective portion of a code symbol in order for suitable processing to occur, even if the non-reflective portion exhibits minimal if any processable reflectance. It is at least this reflectance, as a minimal value, which must be exhibited in order to obtain successful processing when contrasted with a low reflective portion of even the most minimal reflectance in the visible or infrared region, which is referred to when it is said that "a reflectance in the visible or infrared region which would be suitable for processing code indicia infrared scanning apparatus" is provided.

It is preferred that the composition exhibit a reflectance in the visible range, particularly in the range of from about 620 to 650 nm, of at least about 31.6 percent, which would make the composition suitable for the reflective portion of a code symbol in contrast with a low reflective portion exhibiting a reflectance of about 2.5 percent or less, in accordance with the set UPC guidelines. It is most preferred, however, that the marking compositions of the present invention exhibit a reflectance of at least about 42 percent in the range of from about 600 to 1000 nm, and in particular in the wavelength range of from about 620 to about 650 nm, so that it can successfully be used with low reflective surfaces providing a background which exhibits a reflectance of only up to about 5 percent, particularly, by imprinting indicia in a negative mode, on such low reflective surfaces with the voids between the indicia comprising the low reflective portion of the symbol. The UPC guidelines for Print Control Signal are thereby met.

The relative amounts of colored and white pigments employed in the compositions of the invention will depend upon the actual reflectance required, as well as the shade of color desired and the particular pigments employed. The actual reflectance needed to be exhibited by the marking composition when used for marking the reflective portion of a code symbol will vary according to the actual reflectance of the relative low reflective portion of the symbol, with the greater the reflectance of said low reflective portion, the greater reflectance needed to be exhibited by the marking composition. As well, different pigments will absorb or reflect within the visible and infrared regions more or less than others, with this being true even for pigments of the same color. One should, however, be able to readily ascertain the particular mixture of pigments necessary to provide the desired or needed reflectance for the particular undertaking at hand.

It should be noted that while the guidelines for percent reflectance and PCS, as set by Distribution Codes, Inc., have been done so in order to assure adequate readability, the UPC symbol may also be readable when the percent reflectance of the marking composition is somewhat less than that stated by the guidelines. For the purposes of the present invention the percent reflectance need only be such as to allow for sufficient contrast so that the symbol can be accurately processed by UPC or other code indicia scanning apparatus. The guidelines, however, will insure that the PCS is adequate and should thus be generally followed.

The marking compositions can be formulated simply by mixing, for example, any two conventional marking compositions, e.g., an ink or paint, which contain the desired pigments. The respective portions of the marking compositions to be mixed, of course, will depend upon the respective amounts of pigments desired in the final composition, which as mentioned before, will depend on the particular reflectance characteristics of the particular pigments and color shade desired. The composition can also be formulated by mixing the pigments in their desired proportions with conventional solvents and varnish resins, as well as any other conventional additives, such as viscosity enhancing agents, which do not adversely effect the reflectance characteristics of the marking composition to the extent it cannot give a sufficient reflectance to be processed by a code indicia scanning system. Other pigments which do not so detrimentally effect the reflectance characteristics of the marking composition may also be present. However, it is important in this respect to generally avoid the incorporation of black pigment in the marking composition, the presence of which in even small amounts has been found to preclude any processable reflectance by the composition.

The marking composition of the present invention finds particular applicability when the colored pigment is red, which thereby provides a red marking composition and a means for employing a red code symbol successfully. The following examples are given as specific illustrations of such red marking compositions formulated in accordance with the present invention. It should be understood, however, that the specific details set forth in the examples are merely illustrative and in nowise limitative. All parts and percentages in the examples and the remainder of the specification are by weight unless otherwise specified.

EXAMPLE 1

The following formulation provides a most preferred red UPC scannable marking composition which can be successfully employed for marking code indicia in the negative mode on low reflective substrates. The various conventional pigments, solvents, varnishes andd additive ingredients used in the marking composition formulation are as follows:

Kolor-Cure GA 76 Base
Kolor-Cure White Pigment Concentrate, Opaque
Kolor-Cure Red Pigment Concentrate, Opaque
Sensitizer No. 1
  all obtainable from T and C Graphic Supplies, Inc. of Elk Grove Village, Ill.;
Ultra-Cure I-100 (CTX) manufactured by Sherwin Williams Co.; and Cab-O-Sil M5 of the Cabot Corporation.

40 lb. of the GA-76 base are mixed with 17.9 percent by weight of the GA-76 base of the white pigment and 17.9 percent by weight of the GA-76 base of the red pigment.

About 5 lbs. each of the Sensitizer No. 1 and Ultra-Cure I-100 are mixed and then ball milled for 2 hours at 30 rpm with 12 stainless steel balls of 2 inches in diameter. This formulation is then added to the pigment formulation in the amount of one percent by weight of said formulated pigment compound, with the resultant mixture then being ball milled for about one hour at 30 rpm with 12 stainless steel balls of 2 inches in diameter.

The color of resulting marking composition is red, corresponding to PMS No. 200C. The viscosity of the composition is about 20,000 cps±200 cps at 75° F.

If the viscosity of the marking composition is not sufficient for the intended purpose or if a more viscous formulation is desired, the viscosity of the composition can be readily increased by adding small amounts of the Cab-O-Sil or some other suitable material to the formulation. The Cab-O-Sil can be added to the formulation and then the entire mixture mixed for 5 minutes with a motorized paint stirrer or ball mill. The viscosity can be checked by conventional means, e.g., a Brookfield Viscometer using a No. 7 spindle.

EXAMPLE II

An epoxy ink suitable as a red UPC scannable marking composition was prepared as follows:

50 percent Pantone white pigment, 12.5 percent Pantone Rubine Red pigment and 37.5 percent Pantone Warm Red pigment were mixed to provide a marking composition having a Brookfield viscosity of 20,000 c.p.s.±200 at 85° F. The color of the composition corresponded to Pantone Matching System No. 193C.

It has also been found that a suitable red marking composition can be formulated by mixing the following:
  40% by weight red pigment such as that available from Dynachem Corp.; and
  60% by weight GA-76 opaque white ink such as that available from Dynachem Corp.

Upon mixing the above ingredients, a suitable red marking composition showing good reflectance in the red visible and infrared region is obtained. The composition should have a viscosity of about 21,850 cps as measured with a Brookfield Viscometer Model R.E.F. with a #6 spindle and a factor of 500 at 20 R.P.M. with a temperature of 28.5 centigrade.

The marking compositions of the present invention, e.g., such as that exemplified above, find particular applicability in the imprinting of code symbol indicia to be processed by code indicia scanning systems operating in the range of from about 600 to about 1000 nm on a substrate which exhibits a low reflectance in the range of from 600 to 1000 nm upon impinging light radiation against the substrate. The indicia are simply imprinted directly on the substrate with the marking composition, even though the color is red, which saves the expense and activity of multiple printing steps. Upon imprinting the indicia, however, due to the reflectivity of the marking composition, the indicia are imprinted on the substrate in a negative mode so that the imprinted indicia comprise the reflective portion of the symbol and the voids between the printed indicia, which expose the substrate as background, comprise the low reflective portion of the symbol.

It should also be noted that if desired, the marking composition of the present invention can also be used to provide a solid area or space which can act as the reflective background of the symbol, with non-reflective or low reflective indicia then being imprinted thereon. This application may not, however, provide the advantages of avoiding multiple printing steps and/or the use of a color which is not a trade dress color.

The type of substrate which is generally suitable for the purposes of the instant invention is generally any substrate which provides a surface exhibiting a low reflectivity in the visible and infrared regions, and in particular from about 600 to about 1000 nm, e.g., from 620 to about 650 nm. By low reflectivity is meant that the exhibited reflectivity upon the impingement of light radiation on the background provided by the substrate is substantially lower than the reflectivity exhibited by the marking composition of the present invention to be used for imprinting the indicia thereon. The reflectivity exhibited by the background provided by the substrate is preferably low enough that the PCS guidelines for UPC symbols are met, but actually need be only low enough so that a sufficient contrast exists between the substrate background and imprinted indicia to assure adequate bar code readability by a code indicia infrared scanning system, and preferably a UPC scanning system.

Examples of suitable substrates include, but are not limited to, the surface of a cardboard container, or a container or base substrate having a coating, e.g., a coating of paint, which exhibits low reflectivity in the appropriate visible or infrared region. The substrate could be the surface of an opaque container which provides little or no reflectance. The substrate could also be of a transparent nature with a backing or background which exhibits low reflectivity. For example, the substrate can include the surface of a transparent, e.g., glass, container which is filled with a substance or commodity which exhibits little if any reflectance, e.g., up to about 5 percent, in the range of from 600 to about 1000 nm, and in particular, in the wavelength range of from about 620 to about 650 nm.

Indeed, in a preferred embodiment of the present invention, transparent containers are provided with a colored code symbol without the need for using multiple printing steps or stations and without having to use any other color than the trade dress color. This applies particularly to the use of a red code symbol.

The transparent containers of concern are those which are filled with a commodity, solid or liquid, that results in little if any reflectance in the range from 600 to 1000 nm upon impinging radiation on the filled, transparent container. The transparent container is preferably made of glass and is preferably filled with a liquid commodity, for example, orange juice and grapefruit juice. Apple juice and fruit flavored drinks, as well as reconstituted juice, also provide a low reflective background. For example, apple juice only exhibits about a 2 to 7 percent reflectance, while fruit drinks exhibits a reflectance from 1 to about 7 percent. Reconstituted juice exhibits a reflectance of about 5 percent, while the orange and grapefruit juice exhibit a reflectance in the range of from about 2 to 7 percent.

For containers to be filled with such commodities, and in particular the aforedescribed juices and fruit drinks, a processable code symbol in the trade dress color desired, especially red, e.g., corresponding to PMS 200C, can be easily imprinted thereon by employing the marking composition of the present invention. Since the juices do exhibit a reflectance up to about 5 percent, the marking composition exmployed need only exhibit a reflectance of about 42 percent or greater in the range from 600 to about 1000 nm, and in particular in the region of from about 620 to about 650 nm, to meet the guidelines set for UPC symbols by Distribution Codes, Inc., to thereby assure processability of the code symbol. Once the desired marking composition has been formulated, such as that described in the aforedescribed Example having a color corresponding to PMS 200C, the indicia are simply imprinted with the marking composition on the container in the negative mode. In this manner, due to the reflectivity of the red marking composition, the printed indicia can comprise the reflective portion of the code symbol and the voids appearing between the bars of the symbol will actually comprise the non-reflective or relatively low reflective portion of the code symbol.

For example, a glass container to be filled with orange juice or grapefruit juice, and which is imprinted with trade dress in a red color, can be imprinted with a UPC symbol comprising only red printed indicia which substantially match the trade dress color via the present invention. By employing the marking composition, for example, that was formulated in the aforedescribed Example of a red color corresponding to PMS 200C, the indicia can be printed in a single printing step on the glass container, but in the negative mode. The end result is a product having its UPC symbol blend into the trade dress by being in the same color as used for the trade dress. The unsightliness of a label, which detracts from the overall appeal and attractiveness of an item, as well as the expense of multiple printing steps and stations, are avoided.

Thus, the present invention provides one with a means for successfully employing colors such as red in code symbols to be processed by code indicia scanning systems where the background provided by the item exhibits a relative low reflectance in the range from about 600 to about 1000 nm. In practicing the present invention, one realizes the advantages of avoiding the expense of having to use multiple printing steps and/or printing stations while enhancing or maintaining the aesthetic quality of the item. It should be noted that while the present invention finds particular applicability in the area of UPC symbols, it can also be applied to any code system to be processed by a code indicia scanning system, such as the EAN (European Article Numbers) system.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed:

1. A process for marking a substrate exhibiting low reflectance in the visible and infrared region of from about 600 to about 1000 nm with a symbol suitable for use with code indicia scanning apparatus comprising imprinting indicia on said substrate in a negative mode so that the imprinted indicia comprise the reflective portion of the symbol and the voids between the printed indicia comprise the low reflective portion of the symbol, wherein the indicia are imprinted with a marking composition comprising a white pigment which reflects in said visible and infrared region and a colored pigment exhibiting insufficient reflectance itself in said visible and infrared region to be suitable for the reflective portion in a code symbol to be processed by a code indicia scanning means, with said pigments being present in amounts sufficient to provide a contrast in reflectance with the substrate suitable for processing by code indicia scanning apparatus.

2. The process of claim 1 wherein said substrate is marked with a symbol suitable for use with Universal Product Code scanning apparatus and comprises imprinting indicia on said substrate with a marking composition comprising a white pigment which reflects in the visible region around 620 to about 650 nm and a colored pigment, with said pigments being present in the composition in amounts sufficient to provide a relative reflectance in the range of from about 620 to about 650 nm suitable for processing by Universal Product Code scanning apparatus.

3. The process of claim 2 wherein the colored pigment of the marking composition does not substantially reflect in the visible region around 620 to about 650 nm.

4. The process of claim 2 or 3 wherein the substrate is that of a transparent container.

5. The process of claim 4 wherein the substrate is glass.

6. The process of claim 2 or 3 wherein the colored pigment is a red pigment.

7. The process of claim 6 wherein the resultant color tone of the indicia corresponds essentially to Pantone Matching System No. 200C.

8. A process for marking a transparent container with a symbol suitable for use with Universal Product Code scanning apparatus which comprises imprinting indicia on the container in a negative mode so that the imprinted indicia comprise the reflective portion of the symbol and the voids between the printed indicia comprise the low reflective portion of the symbol, with a marking composition comprising a white pigment which reflects in the visible region and a red pigment exhibiting insufficient reflectance itself in said visible region to be suitable for the reflective portion in a code symbol to be processed by a Universal Product Code scanning system, with said pigments being present in amounts sufficient to provide a reflectance relative to the transparent container and its contents in the visible region suitable for scanning by a Universal Product Code scanning apparatus.

9. The process of claim 8 wherein the marking composition used to imprint the indicia in a negative mode is of a color tone which corresponds essentially to Pantone Matching System No. 200C.

10. The process of claim 8 wherein the marking composition used to imprint the indicia in a negative mode has a percent reflectance in the visible region of from about 620 to about 650 nm of at least about 31.6 percent.

11. The process of claim 8 wherein the marking composition used to imprint the indicia in a negative mode has a percent reflectance in the visible region of about 630 to 640 nm of at least about 42%.

12. The process of claim 8 wherein the marking composition used to imprint the indicia in a negative mode comprises about equal portions by weight of red and white pigments.

* * * * *